United States Patent [19]

Kingsbury, Jr. et al.

[11] 4,160,655

[45] Jul. 10, 1979

[54] PROCESS FOR MAKING GRADIENT PHOTOCHROMIC GLASS ARTICLES

[75] Inventors: Paul I. Kingsbury, Jr., Elmira; Thomas P. Seward, III, Corning, both of N.Y.

[73] Assignee: Corning Glass Works, Corning, N.Y.

[21] Appl. No.: 861,962

[22] Filed: Dec. 19, 1977

[51] Int. Cl.² .................... C03K 15/00; C03B 31/00
[52] U.S. Cl. ...................................... 65/30 R; 65/33; 65/111; 65/115; 65/DIG. 2; 106/DIG. 6
[58] Field of Search .............. 65/DIG. 2, 33, 30 R, 65/111, 115; 106/DIG. 6

[56] References Cited

U.S. PATENT DOCUMENTS

| | | |
|---|---|---|
| 3,540,793 | 11/1970 | Arauso et al. ............... 65/DIG. 2 X |
| 3,734,754 | 5/1973 | Randall et al. .............. 65/DIG. 2 X |
| 3,833,511 | 9/1974 | Yamashita et al. ......... 65/DIG. 2 X |
| 3,938,977 | 2/1976 | Gliemeroth ................. 65/DIG. 2 X |
| 3,966,311 | 6/1976 | Korn et al. .................. 65/DIG. 2 X |
| 4,017,292 | 4/1977 | Mann ........................... 65/DIG. 2 X |
| 4,036,624 | 7/1977 | Krohn et al. ................ 65/DIG. 2 |
| 4,043,781 | 8/1977 | De Munn et al. .......... 65/DIG. 2 X |

*Primary Examiner*—S. Leon Bashore
*Assistant Examiner*—Frank W. Miga
*Attorney, Agent, or Firm*—Kees van der Sterre; Clinton S. Janes, Jr.; Clarence R. Patty, Jr.

[57] ABSTRACT

A process for the production of a gradient photochromic glass article comprising the selective over-nucleation of a limited portion of the article followed by a photochromic development heat treatment of the entire article, and the product of this process, are described.

4 Claims, No Drawings

PROCESS FOR MAKING GRADIENT PHOTOCHROMIC GLASS ARTICLES

BACKGROUND OF THE INVENTION

A gradient photochromic glass article is a glass article exhibiting a gradient in photochromic properties thereacross. One example is a photochromic glass article having a first region exhibiting properties normal for a photochromic glass and a second region exhibiting photochromic properties which are at least substantially less pronounced than those of the first region. Often the second region is non-photochromic. The transition from the strongly photochromic to the weakly photochromic or non-photochromic region may be gradual or abrupt.

A number of different methods for producing gradient photochromic glass articles are known. U.S. Pat. No. 3,419,370 to Cramer et al., for example, describes an ionexchange method for producing photochromic surface layers on glass which can be utilized to provide photochromic properties in selected regions of a glass article. Canadian Pat. No. 739,404 to Brown et al. describes a method wherein potentially photochromic glass is heat treated in a partitioned lehr, or while partly encased in a refractory block, so that only part of the glass is heated sufficiently to become photochromic. In this method, selective heating or, equivalently, selective insulation from heat are utilized to control photochromic development.

German Patentschrift No. 2,125,232 describes a radiant heating assembly which can be adapted to the production of gradient photochromic glass by selective heating. U.S. Pat. No. 4,036,624 illustrates the use of a gradient furnace to produce gradient photochromic ophthalmic lenses.

It is evident from a study of the prior art that past methods of producing gradient photochromic glass articles through heat treatment involve the suppression of photochromic development in selected portions of the articles by protecting those portions from elevated temperatures. Hence the nucleation and growth of photochromic phases in the glass is retarded by keeping selected portions thereof relatively cool.

For some applications it may be desirable to heat treat potentially photochromic glass at temperatures near its softening point to simultaneously achieve the development of photochromic properties and the sagging of the glass to a desired configuration. This can not be accomplished using prior art photochromic gradient heat treating methods because the temperature gradient which must be maintained in the glass results in non-uniform sagging.

It is a principal object of the present invention to provide a process for producing gradient photochromic glass articles which avoids this and other disadvantages of prior art treatments, offering improved flexibility with respect to the step of heat treating the glass for photochromic development.

Other objects and advantages of the invention will become apparent from the following description and examples thereof.

SUMMARY OF THE INVENTION

In accordance with the present invention, gradient photochromic glass articles are provided through a process involving the non-uniform nucleation of potentially photochromic glass. This process is based on the fact that extensively nucleated potentially photochromic glass of the silver halide type does not readily develop a strong photochromic response characteristic during a subsequent regular heat treatment. Thus we have found that the development of photochromic properties in selected regions of a potentially photochromic glass article can be suppressed by, in effect, "over-nucleating" those regions prior to the normal heat treatment of the glass to develop photochromic properties therein.

The exact mechanism by which selective over-nucleation operates to provide a photochromic gradient in accordance with the invention is not fully understood. However, it is presumed that extensive nucleation provides many sites on which photochromic particles may grow. During the subsequent heat treatment, the available photochromic material in the glass is used up early, resulting in many particles too small in size to be effectively photochromic. Thereafter only relatively long heating, which results in particle modification by an Ostwald-type ripening process, can produce strong photochromic characteristics in the over-nucleated regions of the glass.

Broadly, the process of producing a gradient photochromic glass article in accordance with the present invention comprises the initial step of subjecting a selected limited portion of a potentially photochromic glass article to a nucleation heat treatment. The potentially photochromic glass is one containing silver and halogens, and the nucleation heat treatment is carried out at a temperature above the minimum temperature required for nucleation but below the minimum temperature required for the significant growth of photochromic silver halide particles for a time sufficient to achieve a degree of nucleation which will inhibit the subsequent development of photochromic properties in the selected heated portion of the glass. During this nucleation heat treatment, the portions of the glass which are not to be nucleated are maintained at a temperature below that required for effective nucleation. The selective nucleation step may be carried out using any of the conventional selective heating or insulating devices known in the art.

Following the completion of the nucleation heat treatment, the entire article is heat treated at a temperature sufficient to promote the growth of silver halide-containing particles in the glass, for a time at least sufficient to develop photochromic properties in the regions of the article other than the selected portion exposed to the prior nucleation heat treatment. In general, it is found that substantial photochromic development will not occur in the over-nucleated portions of the glass during a standard heat treatment. Thus excellent control over the photochromic properties of the photochromically developed regions of the article may be exercised, and the simultaneous heat treating and sagging of the article during gradient production is possible.

DETAILED DESCRIPTION

The composition of the potentially photochromic glass used to form the article to be provided with a photochromic gradient in accordance with the invention is not critical, provided that composition is for a glass of the silver halide type. By potentially photochromic glass is meant a glass containing silver, one or more of the halogens chlorine, bromine and iodine, and other ingredients for photochromic sensitization, which glass has not been subjected to a heat treatment to develop photochromic properties therein. Many glasses which are not photochromic as formed, but which may be converted to photochromic glass of the silver halide type by a suitable heat treatment, are known.

In carrying out the process of the invention a clear distinction is drawn between the minimum temperature sufficient to permit the development of nuclei for silver halide growth in the glass and the minimum temperature sufficient to permit the significant growth of a photochromic silver halide phase at those nucleation sites imparting photochromic properties to the glass. The former temperature typically lies slightly above the annealing point of the base glass and the latter temperature between the annealing point and softening point of the glass, for silicate photochromic glasses of the commercial type. The range between these temperatures is, for the purpose of the present description, called the nucleation range. One skilled in the art can readily determine these temperatures by routine experiment for any particular glass.

Of course, the size of the nucleation range (that range between the minimum nucleation temperature and the minimum temperature sufficient to permit the growth of the photochromic silver halide phase in the glass) is a complex function of glass composition and other factors, being relatively small for some glasses and quite large for others. Control of the process is facilitated by selecting for treatment a glass exhibiting a large nucleation range.

The initial step of the present process involves the nucleation of a selected limited portion of a suitable potentially photochromic glass by exposure of that portion to a temperature above the minimum temperature required for the development of nuclei for silver halide growth (e.g., above the annealing point of the potentially photochromic glass), but below the minimum temperature required for silver halide particle growth, for a time sufficient to reduce the photochromic development potential of the exposed portion. By a reduction in photochromic development potential is meant a reduction in the capability of the exposed portion to develop a strong photochromic darkening characteristic during subsequent exposure to a temperature above the minimum silver halide crystallite growth temperature of the glass.

The process of nuclei formation is both time and temperature dependent so that, at higher temperatures in the nucleation range, shorter times are required for sufficient nucleation than at lower temperatures in that range. For alkali boroaluminosilicate glasses of the kind most widely used in the manufacture of photochromic glass, the nucleation range is about 475°–600° C. Suitable nucleation times at these temperatures may range from five minutes or less at the higher end of the range to 60 minutes or more at the minimum nucleation temperature.

The apparatus used for selectively heating a limited portion of a potentially photochromic glass article to nucleation temperatures may be of any suitable type. Examples of such apparatus include a partitioned lehr or a partitioned heat treating furnace containing both heated and unheated regions, or insulating masses for use in conventional lehrs adapted to shield or protect all but the portion of the article selected for nucleation from heat. Such apparatus has been utilized in the prior art to provide gradient photochromic glass by conventional processing, and is more than adequate for use in the present invention, since generally lower temperature gradients and heating times are needed during the nucleation step of the present process.

Following the selective nucleation of a potentially photochromic glass article as described, the entire glass article is exposed to a photochromic development heat treatment at a temperature above the minimum temperature for silver halide crystallite growth to develop photochromic properties in the non-nucleated portions of the article. This heat-treating step may be carried out in any conventional manner, with nucleation and silver halide crystallite growth occurring in the normal way in the non-nucleated portions to provide a strong photochromic darkening characteristic therein.

If desired, suitable modifications in heat treatment may be made to modify the darkened color, darkened transmittance, and the darkening and fading rates of the glass. Also, of course, these properties may be modified by glass composition variations in accordance with current art. In either case, the resistance of the nucleated portion of the article to normal photochromic development means that this portion is not generally affected by normal heat treatment excursions for such purposes.

As is well known, the photochromic development heat treatment may be carried out at temperatures well above the glass softening temperature and ranging up to the temperature at which all silver halides redissolve in the glass (e.g., 900° C. or more). However, for alkali boroaluminosilicate glasses of the commercially available type, the photochromic development heat treatment preferably comprises exposure of the glass article to a temperature in the range of about 600°–675° C. for times in the range of 5–45 minutes.

The product of the selective nucleation and heat treating steps above described is a gradient photochromic glass article comprising a first region exhibiting relatively strong photochromic darkening and fading characteristics and a second region, corresponding to the nucleated portion of the article, wherein the photochromic characteristics, if any, are at least substantially less developed that those of the first portion. With respect to visible appearance, this gradient product may be similar to gradient photochromic articles provided in the prior art.

One apparent difference between the gradient photochromic glass articles of the invention and gradient photochromic glass articles provided in accordance with the prior art is that the articles of the invention normally provide good near-ultraviolet absorption in both the photochromic and non-photochromic regions thereof. Prior art gradient photochromic glass articles, although exhibiting good u.v. absorption in photochromic regions, do not necessarily exhibit such absorption in non-photochromic regions because the latter regions are desirably maintained at temperatures below those required for the formation of silver halide phases.

The invention may be further understood by reference to the following detailed example thereof.

EXAMPLE

A potentially photochromic glass article having a composition, in parts by weight as calculated from the batch, of about 56.2 parts $SiO_2$, 16.0 parts $B_2O_3$, 8.9 parts $Al_2O_3$, 1.8 parts $Na_2O$, 2.65 parts $Li_2O$, 5.0 parts PbO, 6.6 parts BaO, 2.17 parts $ZrO_2$, 0.2 parts Ag, 0.32 parts Cl, 0.63 parts Br, 0.2 parts F, 0.019 parts CuO, 0.032 parts NiO and 0.019 parts CoO is provided for treatment. The glass article is a glass blank for an opthalmic lens, having the form of a glass disc about 65 mm in diameter and 3 mm in thickness.

The lens blank described is positioned on the floor of a small refractory brick cavity having a top port through which an operating radiant electric heating element directs heat onto approximately one-half of the top surface of the lens blank. The remainder of the lens blank is shielded from radiant heat. The distance between the radiant heater and the heated porton of the lens blank is about 2 inches.

The lens blank is kept in the cavity for a heating interval of 15 minutes to over-nucleate the heated portion of the glass. During this interval a thermocouple positioned between the heating element and the heated glass indicates a temperature of about 580° C.

At the end of the heating interval the glass with over-nucleated and shielded portions is removed from the cavity and positioned in an air-circulating chest furnace where it is uniformly heated to the furnace operating temperature of 625° C. The glass is kept in the furnace for 15 minutes and then removed from the furnace, cooled, and examined for photochromic properties.

The undarkened lens blank has a uniform visible transmittance across its diameter, a typical value in 3 mm thickness being about 67%. After photochromic darkening of the lens by exposure to a black-light blue fluorescent lamp for an interval of 20 minutes, transmittance measurements are taken across a diameter of the lens running through both the photochromic (originally shielded) and non-photochromic (over-nucleated) regions in a direction at right angles to a line dividing these regions. The following data is recorded:

| Measurement Position | Visible Transmittance |
| --- | --- |
| over-nucleated edge | 45% |
| ¼ diameter | 45% |
| center | 45% |
| ¾ diameter | 16% |
| photochromic edge | 11% |

After a fading overnight, the glass again exhibits essentially uniform transmittance (about 67%) across its diameter.

Of course, the foregoing example is merely illustrative of techniques which may be adapted to the production of gradient photochromic glass articles in accordance with the invention. Obviously, adjustments in time, temperature, and heat-treating procedure may be made to compensate for changes in glass composition, glass thickness and variables relating to the particular apparatus employed. Nevertheless, the advantages of the process of the present invention for the production of gradient photochromic glass articles, including ophthalmic lenses or other articles wherein a gradient in photochromic properties is desired, are evident.

We claim:

1. A process for producing a gradient photochromic glass article by the selective over-nucleation of a limited portion of the glass article which essentially comprises the steps of:

(a) subjecting a selected limited portion of a potentially photochromic glass article containing silver and a halogen selected from the group consisting of chlorine, bromine and iodine to a nucleation heat treatment at a temperature above the minimum temperature necessary for the development of nuclei for silver halide growth in the glass but below the minimum temperature required for the growth of photochromic silver halide particles in the glass, for a time at least sufficient to reduce the photochromic development potential of said selected limited portion, in order to obtain the selective over-nucleation of said portion, while maintaining the remainder of the glass article at a temperature below the minimum temperature necessary for the development of nuclei for silver halide growth therein; and (b) subjecting the entire potentially photochromic glass article to a photochromic development heat treatment at a temperature above the minimum temperature sufficient to permit the growth of silver halide crystallites in the glass for a time at least sufficient to develop photochromic properties in the remaining portion of the glass article not subjected to selective over-nucleation.

2. A process in accordance with claim 1 wherein the potentially photochromic glass article is composed of an alkali boroaluminosilicate glass.

3. A process in accordance with claim 2 wherein the potentially photochromic glass article is exposed to said nucleation heat treatment comprising heating at a temperature in the range of 475°–600° C. for a time in the range of 5–60 minutes.

4. A process in accordance with claim 3 wherein the entire potentially photochromic glass article is exposed to said photochromic development heat treatment comprising heating at a temperature in the range of about 600°–675° C. for a time in the range of about 5–45 minutes.

* * * * *